United States Patent [19]
Sekine et al.

[11] Patent Number: 5,754,710
[45] Date of Patent: May 19, 1998

[54] IMAGE RESOLUTION CONVERSION METHOD AND APPRATUS THEREOF

[75] Inventors: Hiroshi Sekine; Yoshihiro Terada; Toshiya Koyama, all of Kanagawa, Japan

[73] Assignee: Fuji Xerox Co., Ltd., Tokyo, Japan

[21] Appl. No.: 620,750

[22] Filed: Mar. 18, 1996

Related U.S. Application Data

[63] Continuation of Ser. No. 286,446, Aug. 5, 1994, abandoned.

[30] Foreign Application Priority Data

Aug. 6, 1993 [JP] Japan .................................. 5-215243

[51] Int. Cl.$^6$ .................................................. G06K 9/32
[52] U.S. Cl. ........................ 382/300; 348/428; 348/451
[58] Field of Search .................................. 382/199, 200, 382/209, 250, 298, 300; 358/428, 451; 245/122, 138, 127

[56] References Cited

U.S. PATENT DOCUMENTS

| | | | |
|---|---|---|---|
| 4,381,547 | 4/1983 | Ejiri | 382/47 |
| 4,484,347 | 11/1984 | Kashioka | 382/47 |
| 4,736,439 | 4/1988 | May | 382/54 |
| 5,487,115 | 1/1996 | Surka | 382/199 |
| 5,491,759 | 2/1996 | Nagao et al. | 382/199 |
| 5,511,137 | 4/1996 | Okada | 382/199 |

FOREIGN PATENT DOCUMENTS

| | | |
|---|---|---|
| 3-11476 | 1/1991 | Japan . |
| 4-192875 | 7/1992 | Japan . |

*Primary Examiner*—Joseph Mancuso
*Attorney, Agent, or Firm*—Finnegan, Henderson, Farabow, Garrett & Dunner, L.L.P.

[57] ABSTRACT

An image resolution conversion method converting an image of a first resolution represented by multivalued digital data into an image of a second resolution by interpolation, comprises the steps of assigning a block defined by a plurality of pre-conversion pixels of the first resolution image to each post-conversion pixel, performing edge detection in the block based on data for each pixel of the block, and performing resolution conversion by a first interpolation method when at least the result of the edge detection satisfies predetermined conditions, and performing resolution conversion by a second interpolation method when the result of the edge detection does not satisfy the predetermined conditions.

14 Claims, 16 Drawing Sheets

Pij DH 1      Pi+1j DH 1     Pij+1 DH 1     Pi+1j+1 DH1

FIG. 4
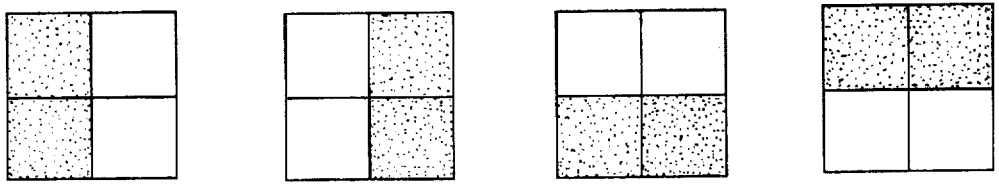
FIG. 5(a)
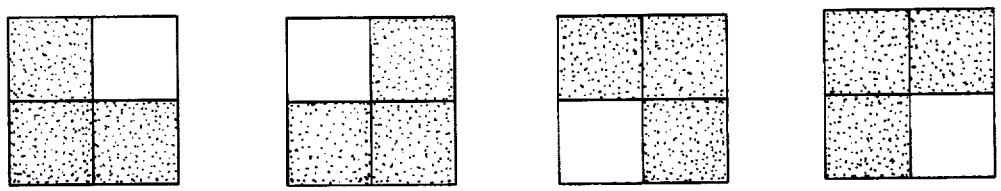
FIG. 5(b)    FIG. 5(c)    FIG. 5(d)
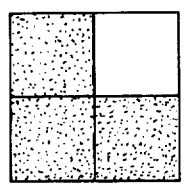 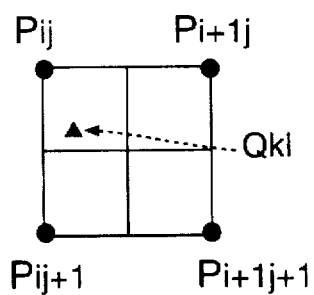 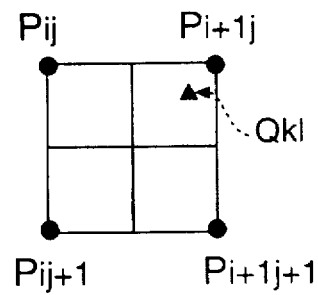

| 255 | 0 | 0 | 0 |
|---|---|---|---|
| 220 | 255 | 0 | 0 |
| 185 | 220 | 255 | 0 |
| 150 | 185 | 220 | 255 |

| 255 | 0 | 0 | 0 | 0 | 0 |
|---|---|---|---|---|---|
| 220 | 255 | 255 | 0 | 0 | 0 |
| 220 | 255 | 255 | 0 | 0 | 0 |
| 185 | 220 | 220 | 255 | 255 | 0 |
| 185 | 220 | 220 | 255 | 255 | 0 |
| 150 | 185 | 185 | 220 | 220 | 255 |

*FIG. 9*

| 201 | 109 | 48 | 16 | 0 | 0 |
|---|---|---|---|---|---|
| 219 | 201 | 143 | 48 | 0 | 0 |
| 220 | 238 | 201 | 109 | 48 | 16 |
| 203 | 220 | 219 | 201 | 143 | 48 |
| 185 | 203 | 220 | 238 | 201 | 109 |
| 168 | 185 | 203 | 220 | 219 | 201 |

*FIG. 10*

| 255 | 109 | 0 | 0 | 0 | 0 |
|---|---|---|---|---|---|
| 220 | 255 | 143 | 0 | 0 | 0 |
| 220 | 255 | 255 | 109 | 0 | 0 |
| 203 | 220 | 220 | 255 | 143 | 0 |
| 185 | 203 | 220 | 255 | 255 | 109 |
| 168 | 185 | 203 | 220 | 220 | 255 |

| a<br><br>(Y,M,C)=<br>(0,255,127) | b<br><br>(0,0,0) | c<br><br>(0,0,0) | d<br><br>(0,0,0) |
| --- | --- | --- | --- |
| e<br><br>(0,220,110) | f<br><br>(0,255,127) | g<br><br>(0,0,0) | h<br><br>(0,0,0) |
| i<br><br>(0,185,92) | j<br><br>(0,220,110) | k<br><br>(0,255,127) | l<br><br>(0,0,0) |
| m<br><br>(0,150,75) | n<br><br>(0,185,92) | o<br><br>(0,220,110) | p<br><br>(0,255,127) |

IMAGE RESOLUTION CONVERSION METHOD AND APPRATUS THEREOF

This application is a continuation, of application Ser. No. 08/286,446, filed Aug. 5, 1994, now abandoned.

BACKGROUND OF THE INVENTION

1. Field of the Invention

The present invention relates to an image resolution conversion method and apparatus for converting the resolution of a digital image from a first resolution to a second resolution.

2. Discussion of the Related Art

Generally known resolution conversion methods for a multivalued digital image include the simple holding method in which the original image pixel value above and to the left of a post-conversion pixel is used as the interpolation value, the nearest neighbor interpolation method in which the original image pixel value nearest to the post-conversion point is used as the interpolation value, the bi-linear interpolation method which obtains an interpolation value by a linear operation on four original image pixels surrounding a post-conversion point, the cubic convolution interpolation method which obtains an interpolation value by a cubic operation based on sixteen original image pixels surrounding the post-conversion point, and so forth.

Recently printers capable of printing multivalued image data of high quality output by personal computers or workstations have appeared. In general, the display resolution of a personal computer or a workstation is about 75 to 100 dpi, whereas the resolution of a printer is about 300 to 600 dpi, which furthermore is improving year by year. To output an image on a display of 100 dpi resolution with a printer of 400 dpi resolution and make the printed image the same size as that presented on the display, for example, a 1:4 resolution conversion process is required.

However, at such a high resolution conversion rate, "block" patterns caused by the interpolation occur in the conventional holding method and nearest neighbor interpolation method, and in the bi-linear interpolation method, blurring occurs around edges where the image values changes sharply in the original image. This blurring around the edges is somewhat reduced by the cubic convolution interpolation method, but there are still problems such that contouring effects occur in gradational portions in which the image density changes gradually.

As a means for improving the interpolation method utilizing linear interpolation, Japanese Patent Application Unexamined Publication No. Hei. 4-192875 (1992) proposed a method of determination of pre-conversion reference pixels by extracting an original image block surrounding a post-conversion pixel, binarily converting each pixel in the block, and combining these binarily converted pixels. However, since this method obtains a value of the post-conversion pixel by an interpolation operation, the post-conversion pixel will always be gray if it is newly inserted between a white pixel and a black pixel. Therefore, the gray image area is enlarged as the magnification rate increases, thus causing a problem of blurring in the enlarged image.

The object of the above-described methods is principally a monochrome (gray-scale) image. If the above processes are carried out on each component of a color image such as the red, green and blue images of an RGB image, there are some cases where different interpolation methods are selected for the red, green and blue images. Therefore, problems occur, in the form of colored characters, colored lines, color blurring around edges and colored edges.

SUMMARY OF THE INVENTION

The present invention has been made in view of the above circumstances and has as an object the provision of an image resolution conversion method and an apparatus thereof in which generation of contouring effects in gradational portions and blurring around edges are restrained in converting the resolution of image data for a monochrome or color image.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the image resolution conversion method converting an image of a first resolution represented by multivalued digital data into an image of a second resolution by interpolation of this invention comprises the steps of assigning a block of predetermined shape for each post-conversion pixel, comprising a plurality of pre-conversion pixels of the first resolution surrounding the post-conversion pixel, performing edge detection in the block based on data for each pixel of the block, and performing resolution conversion by first interpolation method when at least the result of the edge detection satisfies predetermined conditions, and performing resolution conversion by a second interpolation method when at least the result of the edge detection does not satisfy the predetermined conditions.

The image resolution conversion apparatus according to the present invention converting an image of a first resolution represented by multivalued digital data into an image of a second resolution by interpolation, comprises first interpolation means for performing interpolation to obtain a post-conversion pixel based on data for pre-conversion pixels surrounding the post-conversion pixel, second interpolation means for performing interpolation to obtain a data value for a post-conversion pixel by a method different from the interpolation of the first interpolation means, blocking means for forming a block of predetermined shape for each post-conversion pixel comprising a plurality of pixels of the first resolution surrounding the post-conversion pixel based on the conditions of the post-conversion pixel, edge detection means for performing edge detection in the block formed by the blocking means based on data for each pixel of the block, pattern generation means for generating an edge pattern by binary conversion of the pixels of the block formed by the blocking means, comparison means for employing the edge pattern generated by the pattern generation means with a predetermined pattern, and switching means for employing the second interpolation means for obtaining data for the post-conversion pixel when the comparison means finds a correspondence of the edge pattern detected in the block by the edge detection means with the predetermined pattern, and for employing the first interpolation means when the comparison means finds no correspondence of the edge pattern detected in the block by the edge detection means with the predetermined pattern.

With the above construction, the following processes can be performed. Data for a post-conversion pixel is calculated by switching among a plurality of interpolation methods such as bi-linear interpolation and nearest neighbor interpolation based on blocked and binarily converted data and the positional relationship between the post-conversion pixel and the blocked image data. In the case of a color image, discrimination data for each pixel for discriminating the image construction is generated from the color image data, and a plurality of pixels around the post-conversion pixel are blocked based on their discrimination data, and then data for the post-conversion pixel is calculated by switching among a plurality of interpolation methods based on the difference between maximum and minimum values of the blocked discrimination data, binarily converted data and the positional relationship between a post-conversion pixel and the blocked discrimination data.

Therefore, the interpolation operation on the edge is limited and as a result, blurring of edges is reduced even with a high resolution conversion factor, and generation of "block" patterns or contouring effects around the edges caused by the interpolation can also be prevented, thus making it possible to obtain a resolution conversion image of high quality. In the case of color image processing, a single interpolation method is applied to all color components, and accordingly color bleeding around the edges or blurring of different colors along the edges can be avoided.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 2(a), FIG. 2(b) and FIG. 2(c) are views illustrating principles of image resolution conversion using bi-linear interpolation, in which FIG. 2(a) shows an original image, FIG. 2(b) is a converted image, and FIG. 2(c) shows pixels of the original image located around a post-conversion pixel $Q_{k1}$ when the converted image is superimposed on the image before conversion;

FIG. 3(a), FIG. 3(b) show a method of representation of patterns of binarily converted pixels, in which FIG. 3(a) shows a positional relationship among four blocked pixels and FIG. 3(b) shows the case where the binary conversion result of one of the pixels is 1 and the results of the other three pixels are 0;

FIG. 4 shows four patterns of a binarily converted block including two 1 pixels and two 0 pixels;

FIG. 5(a) shows four patterns of a binarily converted block including three 1 pixels and one 0 pixel;

FIG. 5(b) shows one of the patterns in FIG. 5(a), taken as an example of a pattern match;

FIG. 5(c) shows an example in which a post-conversion pixel $Q_{k1}$ is located at the black area in FIG. 5(b);

FIG. 5(d) shows an example in which a post-conversion pixel $Q_{k1}$ is located at the white area in FIG. 5(b);

FIG. 9 shows a result of image resolution conversion applying the nearest neighbor interpolation method to FIG. 7;

FIG. 10 shows a result of image resolution conversion applying the bi-linear interpolation method to FIG. 7;

DETAILED DESCRIPTION OF THE PREFERRED EMBODIMENTS

Preferred embodiments of an image resolution conversion method and apparatus thereof according to the present invention are now described in detail based on the drawings.

First Embodiment

Figure 1:
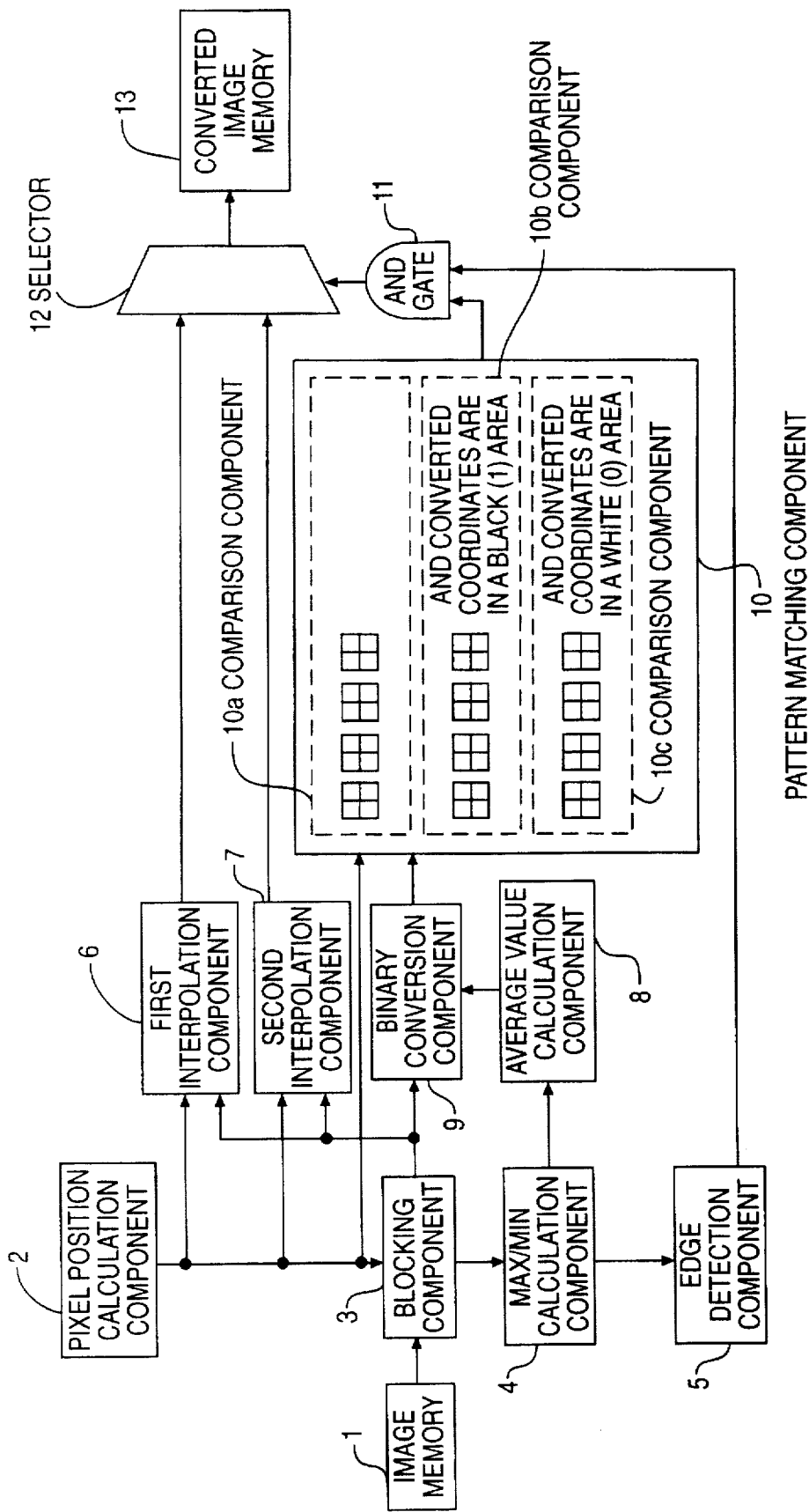
FIG. 1 is a block diagram showing a hardware construction in the case where an image resolution conversion method according to the present invention is applied to a monochrome image.

FIG. 1 shows the hardware construction of an image resolution conversion apparatus applied to a monochrome image. For easy understanding, pattern matching using 2×2 pixels is employed in this embodiment.

Figure 2A:
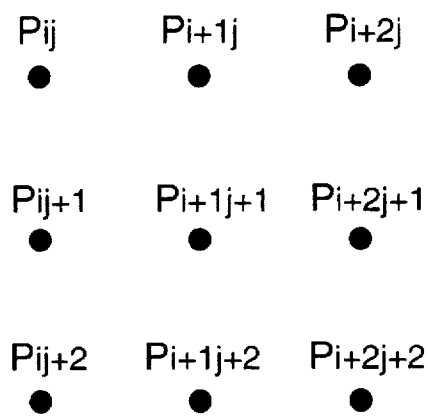
Figure 2:
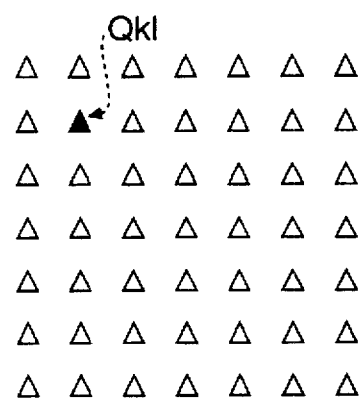
Figure 2:
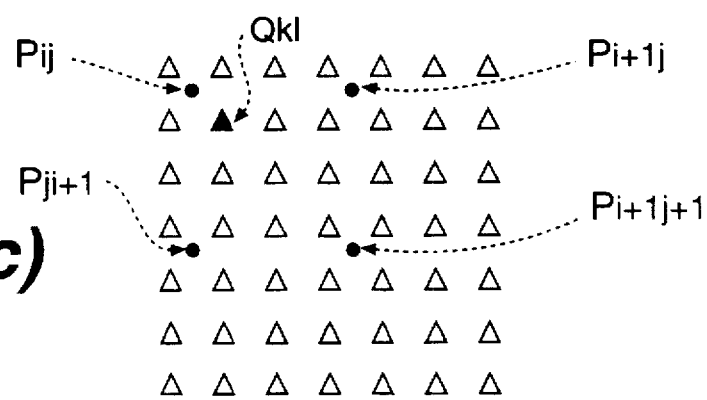
Figure 3A:
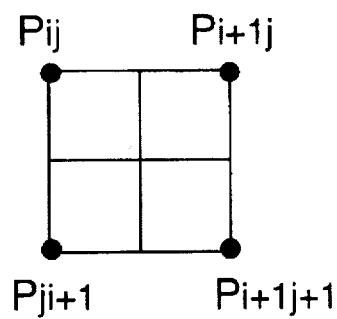
Figure 3B:
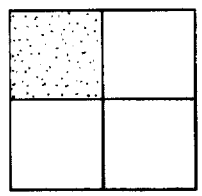
Figure 3B:
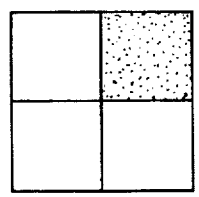
Figure 3B:
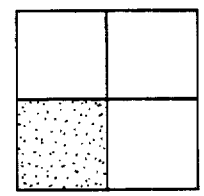
Figure 3B:
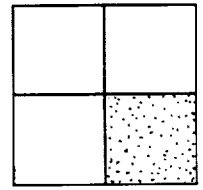

In the figure, a multivalued digital image is input to an image memory 1. A position of a post-conversion pixel is calculated by a position calculation component 2. Based on the position of the post-conversion pixel input from the position calculation component 2, a blocking component 3 reads data for a block of 2 pixels vertically by 2 pixels horizontally, a total of four pixels from the image memory 1, which are necessary to interpolate the post-conversion pixel, and selects pixels required for calculation of the post-conversion pixel by bi-linear interpolation. FIG. 2(a) and FIG. 2(b) show an original image and a converted image, respectively, and four pre-conversion pixels, $P_{ij}$, $P_{i+1j}$, $P_{ij+1}$, $P_{i+1j+1}$, are selected from the original image for interpolation of a post-conversion pixel $Q_{k1}$. When the converted image is superimposed on the original image as shown in FIG. 2(c), these four pixels are located around the post-conversion pixel $Q_{k1}$.

A max/min calculation component 4 calculates the maximum and minimum values of the four pixels blocked by the blocking component 3. An edge detection component 5 finds the difference between the maximum and minimum values obtained by the max/min calculation component 4, and performs binary conversion by comparing the difference with a threshold level. After the binary conversion, the edge detection component 5 outputs 1 when the difference between maximum and minimum values is larger than the threshold level, and 0 when the difference is not more than the threshold level to an AND gate 11. That is, 1 is output corresponding to edges where the image data changes sharply.

A first interpolation component 6 calculates a pixel value using bi-linear interpolation and a second interpolation component 7 calculates it using nearest neighbor interpolation. The first and second interpolation components employed here have magnifying resolution conversion functions. An average value calculation component 8 calculates the average value of the maximum and minimum values obtained by the max/min calculation component 4 and determines it to be a second threshold level. A binary conversion component 9 performs binary conversion of each pixel of the 2×2 pixel block based on the threshold level provided by the average value calculation component 8. A pattern-matching component 10 compares the pattern of a block binarily converted by the binary conversion component 9 and the position of the post-conversion pixel calculated by the pixel position calculation component 2, and outputs 1 if the binarily converted pattern and the position of the post-conversion pixel match any one of the conditions 10a, 10b and 10c, and outputs 0 if the pixel position does not coincide with any of these conditions.

The pattern-matching is now described in further detail based on FIGS. 3–6. FIG. 3(a) shows four pre-conversion pixels $P_{ij}$, $P_{i+1j}$, $P_{ij+1}$ and $P_{i+1j+1}$ blocked by the blocking component 2 and the positional relationship therebetween. FIG. 3(b) shows the patterns in which exactly one of $P_{ij}$, $P_{i+1j}$, $P_{ij+1}$, $P_{i+1j+1}$ is 1 and the other three are 0, in which the pixel value of 1 is represented in black and the pixel values of 0 are represented in white. If there are two or more pixels which are 1 as a result of the binary conversion, similarly areas in the block corresponding to the 1 pixels are represented in black.

The pattern-matching component 10 has three comparison components 10a, 10b and 10c, each of which includes four patterns.

In the comparison component 10a, if a binarily converted block pattern output from the binary conversion component 9 coincides with any one of the four patterns shown in FIG. 4, that is, if there are two 1 pixels and two 0 pixels in the block and the 1 pixels are in a vertical or horizontal line, the comparison component 10a outputs 1.

In the comparison component 10b, if a binarily converted block pattern coincides with any one of the four patterns shown in FIG. 5(a) and the coordinate position after conversion calculated by the pixel position calculation component 2 corresponds to a black portion of the coincident pattern, the comparison component 10b outputs 1.

For example, if the binarily converted pattern coincides with the pattern shown in FIG. 5(b) and the post-conversion pixel $Q_{k1}$ is located at the point shown in FIG. 5(c), the comparison component 10b outputs 1. If the binarily converted pattern coincides with the pattern shown in FIG. 5(b) but the post-conversion pixel $Q_{k1}$ is located at the point shown in FIG. 5(d), the comparison component 10b outputs 0.

Figure 6A:
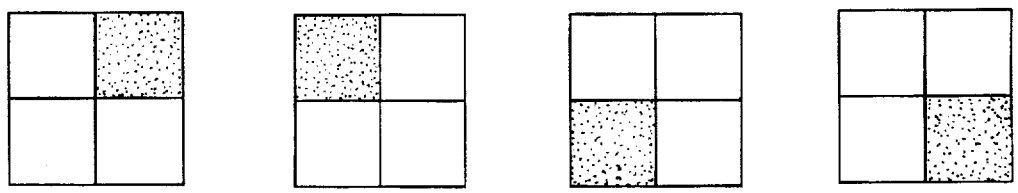
FIG. 6(a) shows four patterns of a binarily converted block including one 1 pixel and three 0 pixels.

Similarly, in the comparison component 10c, if a binarily converted block pattern coincides with any one of the four patterns shown in FIG. 6(a) and the post-conversion pixel position calculated by the pixel position calculation component 2 corresponds to the white portion of the coincident pattern, the comparison component 10c outputs 1.

Figure 6B:
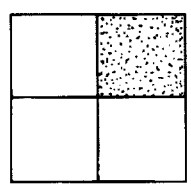
FIG. 6(b) shows one of the patterns in FIG. 6(a), taken as an example of a pattern match.
Figure 6C:
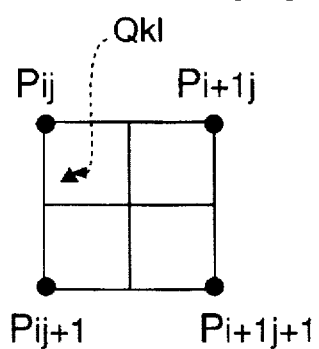
FIG. 6(c) shows an example in which a post-conversion pixel $Q_{k1}$ is located at the black area in FIG. 6(b)
Figure 6D:
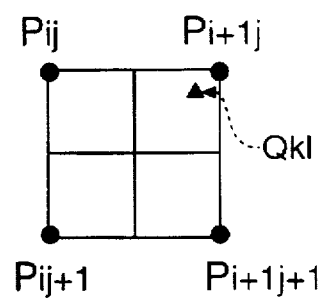
FIG. 6(d) shows an example in which a post-conversion pixel $Q_{k1}$ is located at the white area in FIG. 6(b)

For example, if a binarily converted block pattern coincides with the pattern shown in FIG. 6(b) and a post-conversion pixel $Q_{k1}$ is located at the point shown in FIG. 6(c), the comparison component 10c outputs 1. If a binarily converted block pattern coincides with the pattern shown in FIG. 6(b) and a post-conversion pixel $Q_{k1}$ is located at the point shown in FIG. 6(d), the comparison component 10c outputs 0.

The outputs from the comparison components 10a, 10b and 10c are ORed together to form the output of the pattern-matching component 10.

An AND gate 11 provides the logical AND of the output from the pattern-matching component 10 and an output which is the binary conversion result of an edge detection value of the difference between the maximum and minimum values of a block calculated by the edge detection component 5. That is, when both of the outputs of the pattern-matching component 10 and the edge detection component 5 are 1, the AND gate 11 outputs 1 to a selector 12.

The selector 12 selects either the first interpolation component 6 employing bi-linear interpolation or the second interpolation component 7 employing nearest neighbor interpolation based on the output from the AND gate 11, and outputs the result provided by the selected interpolation component to a converted image memory 13. If the output of the AND gate 11 is 0, the first interpolation component 6 is selected and the result of bi-linear interpolation is output. On the other hand, if the output of the AND gate 11 is 1, the second interpolation component 7 is selected and the result of nearest neighbor interpolation is output.

In the present embodiment, edge detection and generation of the edge pattern are carried out separately, but it is possible to generate the edge pattern only for the detected edges. Basically, detection only of edges in a predetermined shape is sufficient, and when the edge of the predetermined shape is detected, appropriate interpolation is selected to prevent deterioration around the edge caused by the interpolation operation. The edge of the predetermined shape is detected by comparing the pattern of the edge with the predetermined pattern, but the detailed shape of the edge can be detected by combining the pattern comparison with the position of an interpolation point.

The edge of the predetermined shape and the position of the post-conversion point may be other than the example of the present embodiment, provided that the above-described process can be applied to detect an edge which will be deteriorated by the interpolation operation.

Furthermore, the shape of the block provided by the blocking process can be other than the shape employed in the present embodiment.

Figures 7, 8:
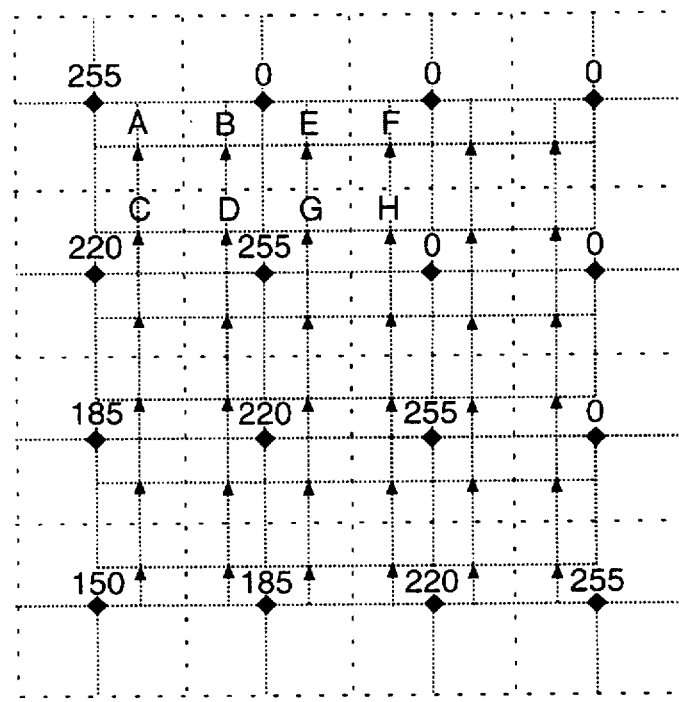
FIG. 7 illustrates an example of ×2 conversion of resolution in both vertical and horizontal directions by application of an image resolution conversion method according to the present invention.
FIG. 8 shows original image data corresponding to FIG. 7, supposing that pixels are square.

Next, an example of the image resolution conversion method according to the present invention will be described based on the image data shown in FIGS. 7 and 8. In FIG. 7, black dots represent pixels of an original image and the numerical value above each black dot is the corresponding pixel value. It is presumed that the image data is 8 bits (ranging from 0 to 255), the pixel value 255 represents black, and the pixel value 0 represents white. A post-conversion pixel is represented by a small black triangle. In this case, the resolution is converted by a factor of 2 in both vertical and horizontal directions. FIG. 8 shows the original image data supposing that the pixels are square, wherein the values of pixels on a diagonal line from top left to bottom right are the highest resolution value 255, pixels in the right side of the diagonal line are all white, and the left side of the diagonal line is a gradation where the resolution is gradually reduced in the direction from the diagonal to the bottom left corner.

FIG. 9 shows an example of nearest neighbor interpolation in which the value of the original image pixel nearest to a point to be interpolated is used as the post-conversion pixel value. As seen in FIG. 9, if nearest neighbor interpolation is applied, large jaggies occur on the diagonal line between top left and bottom right of the block or large block patterns occur in gradational portions. FIG. 10 shows an example of bi-linear interpolation previously described, in which the resolution conversion is carried out after the interpolation data is obtained by a linear operation on the four pre-conversion pixels in the original image around the post-conversion point. Detailed explanation of bi-linear interpolation is omitted here, because it is widely known. The post-conversion pixel $Q_{k1}$ is calculated by the following formula based on the four pixels, $P_{ij}$, $P_{i+1,j}$, $P_{i,j+1}$ and $P_{i+1,j+1}$ shown in FIG. 17:

$$Q_{k1}=(1-x)(1-y)P_{ij}+x(1-y)P_{i+1,j}+y(1-x)P_{i,j+1}+xyP_{i+1,j+1}$$

In the image calculated by the above formula, as shown in FIG. 10, resolution conversion in the gradational portion is performed with high quality. However, blurring occurs on the right side of the diagonal line from top left to bottom right of the block. Therefore, the resolution conversion according to the present invention selects either nearest neighbor interpolation or bi-linear interpolation depending on the pattern-matching of the binarily converted block of four pixels in the original image around the post-conversion pixel and positional relationship to the post-conversion pixel.

Figure 11:
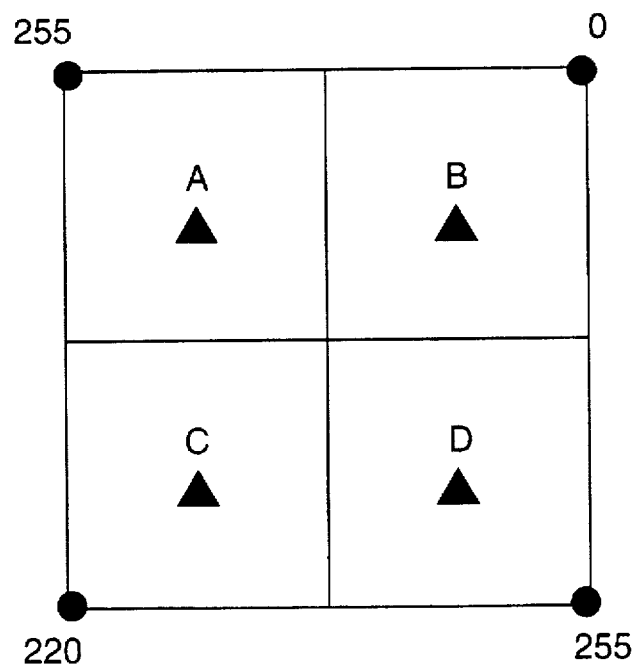
FIG. 11 shows the periphery of pixels after conversion A, B, C and D, extracted from FIG. 7.
Figure 12:
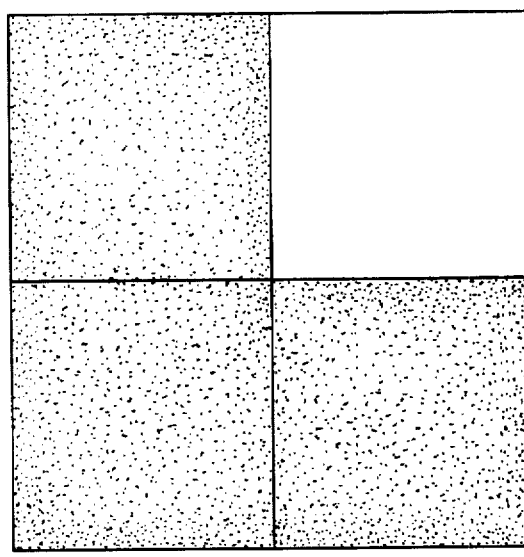
FIG. 12 shows the result of binary conversion of the block shown in FIG. 11.

FIG. 11 shows the extracted periphery of the pixels A, B, C and D in FIG. 7 after resolution conversion, in which the maximum value of four original image pixels is 255 and the minimum value is 0. Accordingly, the threshold level for binary conversion of blocked pixels is 127.5, and the result of the binary conversion is represented in FIG. 12 in the same way as previously described. If the threshold level for binary conversion of the difference between maximum and minimum values is determined to be 100, since the difference in the present invention is 255, the binary conversion value of the difference is 1. Therefore, the post-conversion pixels A, C and D located in the black area in FIG. 12 are calculated by nearest neighbor interpolation, and the post-conversion pixel B located in the white area in FIG. 12 is calculated by bi-linear interpolation.

Figure 13:
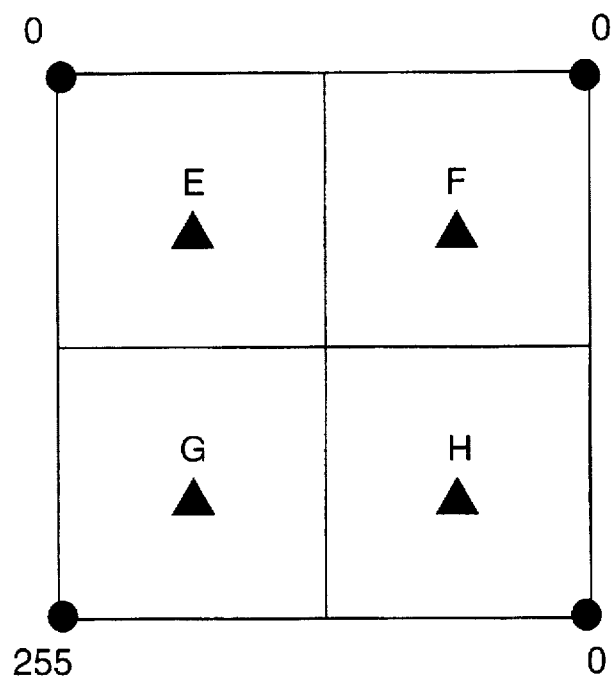
FIG. 13 shows the periphery of pixels after conversion E, F, G and H extracted from FIG. 7.
Figure 14:
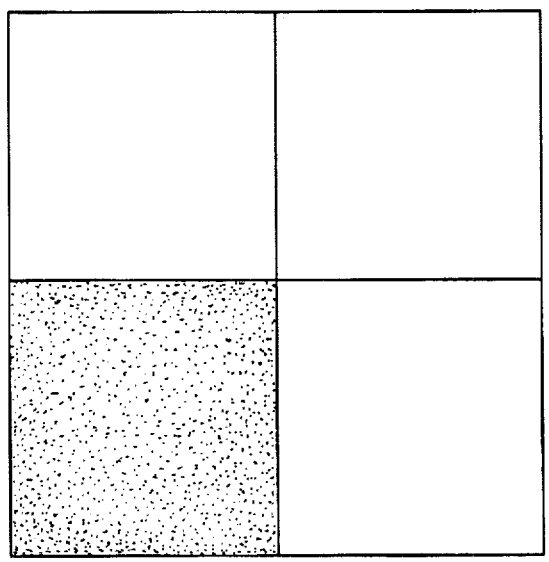
FIG. 14 shows the result of binary conversion of the block shown in FIG. 13.
Figure 15:
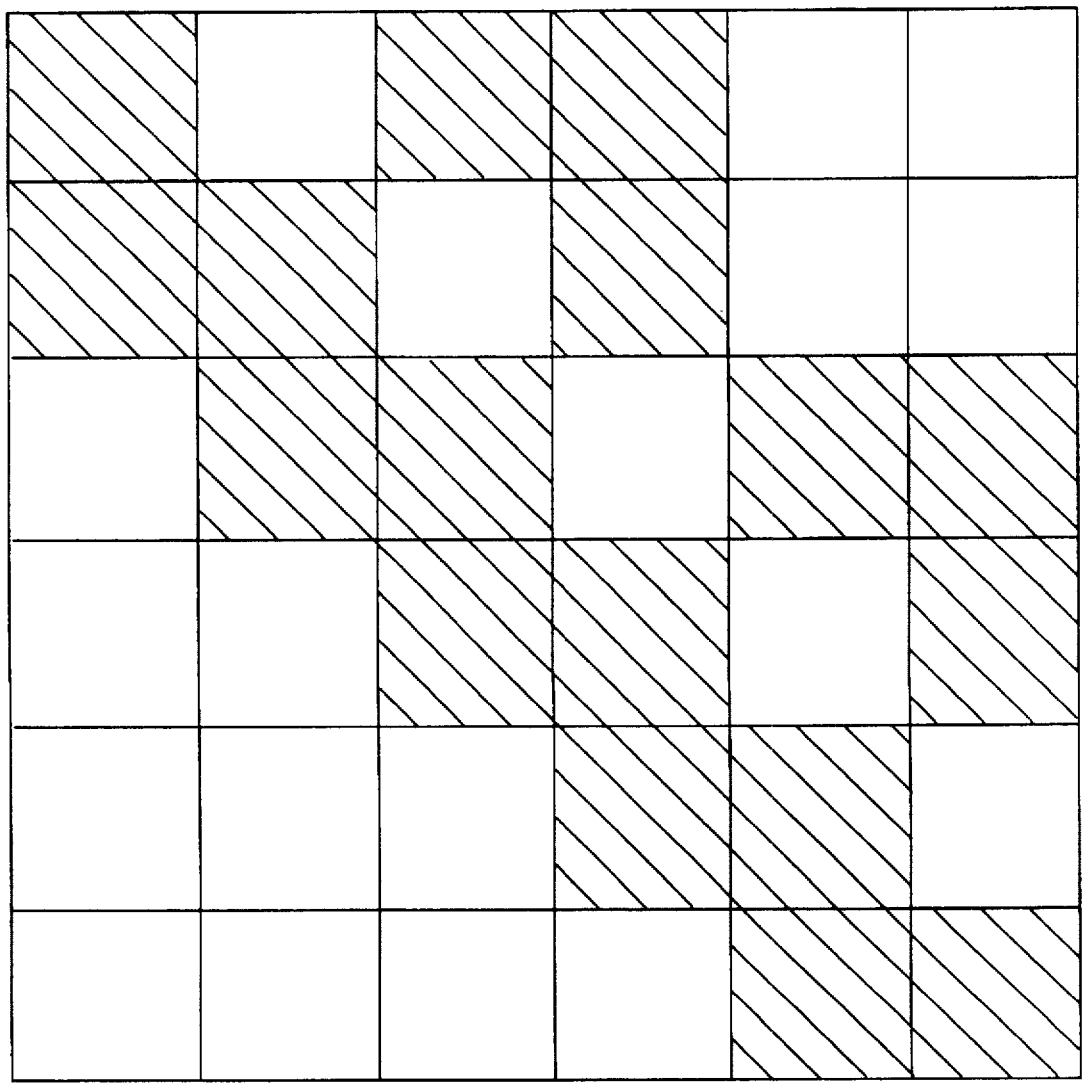
FIG. 15 shows the pixels in FIG. 7 to which the nearest neighbor interpolation method is applied as hatched portions and the pixels to which the bi-linear interpolation is applied as unhatched portions.
Figures 16, 17:
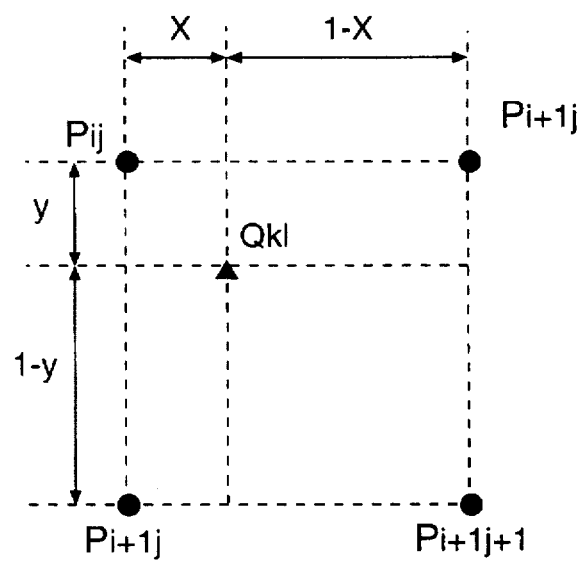
FIG. 16 shows calculation results of all post-conversion pixels in FIG. 7.
FIG. 17 shows the position of a post-conversion pixel $Q_{k1}$ relative to surrounding four pixels in calculating the value of $Q_{k1}$.

FIG. 13 shows the extracted periphery of the pixels E, F, G and H in FIG. 7 after resolution conversion, in which the maximum value of the four original image pixels is 255 and the minimum value is 0. Accordingly, the threshold level for binary conversion of blocked pixels is 127.5, and the result of the binary conversion is represented in FIG. 14 in the same way as previously described. The difference between maximum and minimum values is 255, which is larger than the threshold level 100. Therefore, the post-conversion pixels located in the white area in FIG. 14 are calculated by nearest neighbor interpolation, and the post-conversion pixel G located in the black area in FIG. 14 is calculated by bi-linear interpolation. In performing these calculation on all post-conversion pixels, the post-conversion pixels located in the hatched area in FIG. 15 are calculated by nearest neighbor interpolation and pixels in the white area are calculated by bi-linear interpolation. The calculation result is shown in FIG. 16, in which it can be seen that the image density of both the gradational portion and the diagonal line from top left to bottom right is converted with high quality.

Second Embodiment

Figure 18:
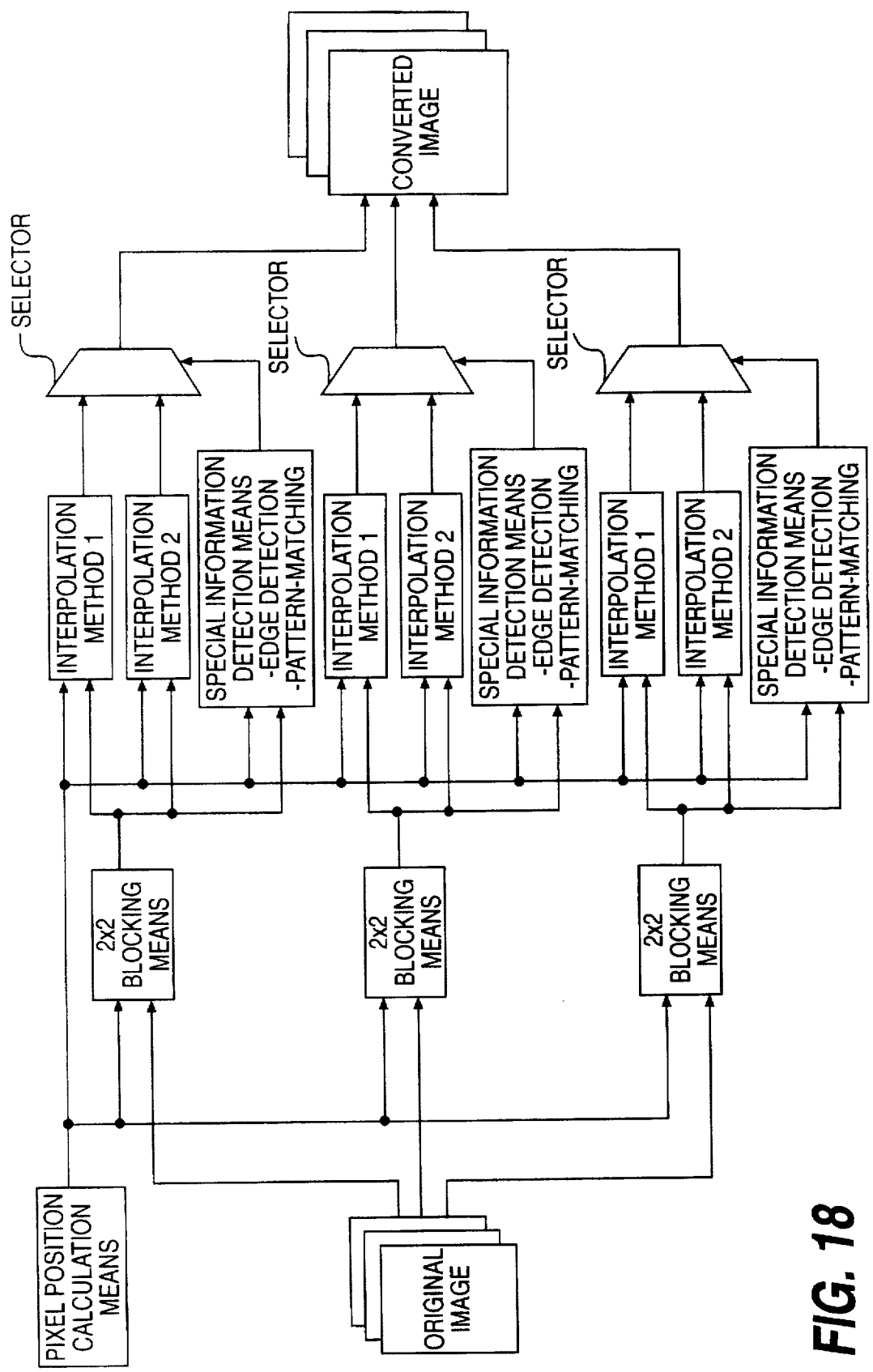
FIG. 18 is a block diagram showing a conceptual view of resolution conversion processing for each color signal of a color image.

Now the second embodiment of the image resolution conversion according to the present invention, applied to a color image will be described. In application to the color image, the above-described resolution conversion process requires some changes. FIG. 18 is a conceptual view in which the above-described resolution conversion process is applied to each color signal of the color image. For example, a color image is an RGB image consisting of red, green and blue signals, and the detection of spatial information such as edge detection and pattern-matching is carried out for each of the red, green and blue signals separately to switch the interpolation methods. In the case where the color image is a YMC image consisting of yellow, magenta and cyan signals or a YMCK image further including a black signal, switching of the interpolation methods is again separately performed for each signal.

Figures 19, 20:
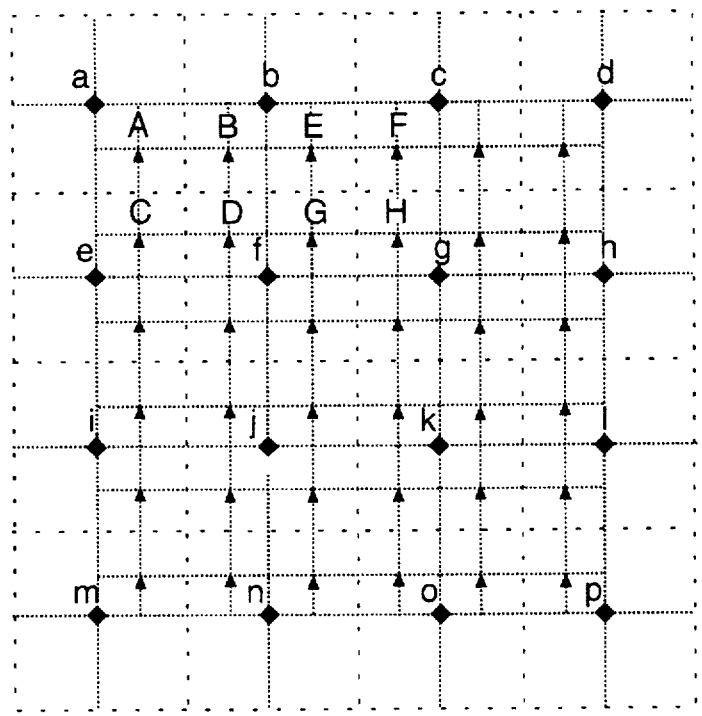
FIG. 19 illustrates an example of ×2 conversion of resolution in both vertical and horizontal directions by application of color image resolution conversion.
FIG. 20 shows original image data corresponding to FIG. 19, supposing that pixels are square.

In the following example, a disadvantage of the construction shown in FIG. 18 in the case of YMC image will be described based on the image data shown in FIGS. 19 and 20. In FIG. 19, a black dot represents the original image and letters a-p above the black dots correspond to those in FIG. 20. Post-conversion pixels are represented by black triangles. In this example, the resolution is converted by a factor of 2 in both vertical and horizontal directions. FIG. 20 shows the original image data, wherein the original image consists of yellow, magenta and cyan signals each of which is 8 bits (0–255), supposing that the density increases as the pixel value varies from 0 to 255. FIG. 20 presumes that the pixels of the original image data are square and numerical values in the square represent density values in the order of yellow, magenta and cyan. In this image data, accordingly, pixels on the diagonal line from top left to bottom right of the figure have the highest density value (Y, M, C)=(0, 255, 127). Pixels located to the right of the diagonal line are all white, and the left of the diagonal line is a gradational image in purple, in which the density gradually reduces in the direction from the diagonal line to the bottom left corner.

Figure 21A:
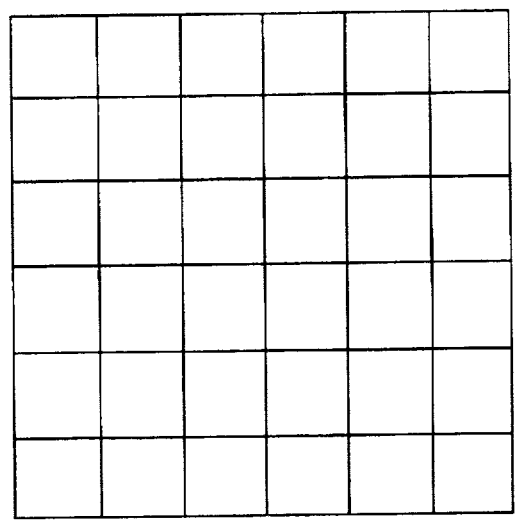
FIG. 21(a), FIG. 21(b) and FIG. 21(c) illustrate the application of interpolation methods to each color signal image, wherein nearest neighbor interpolation is applied to hatched portions and bi-linear interpolation is applied to unhatched portions.
Figure 21B:
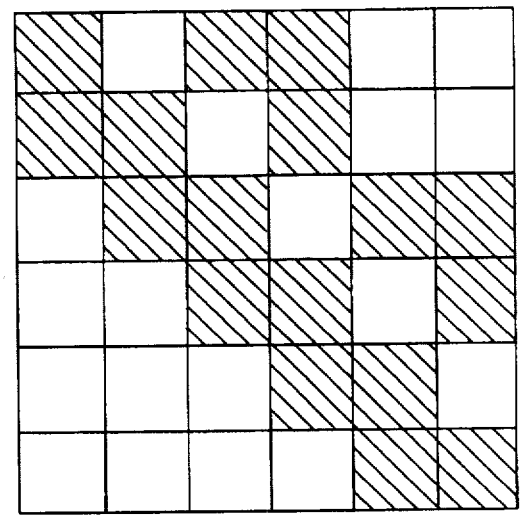
Figure 21C:
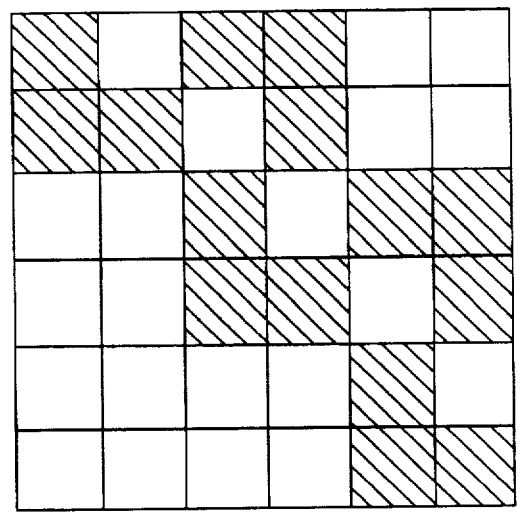
Figure 22:
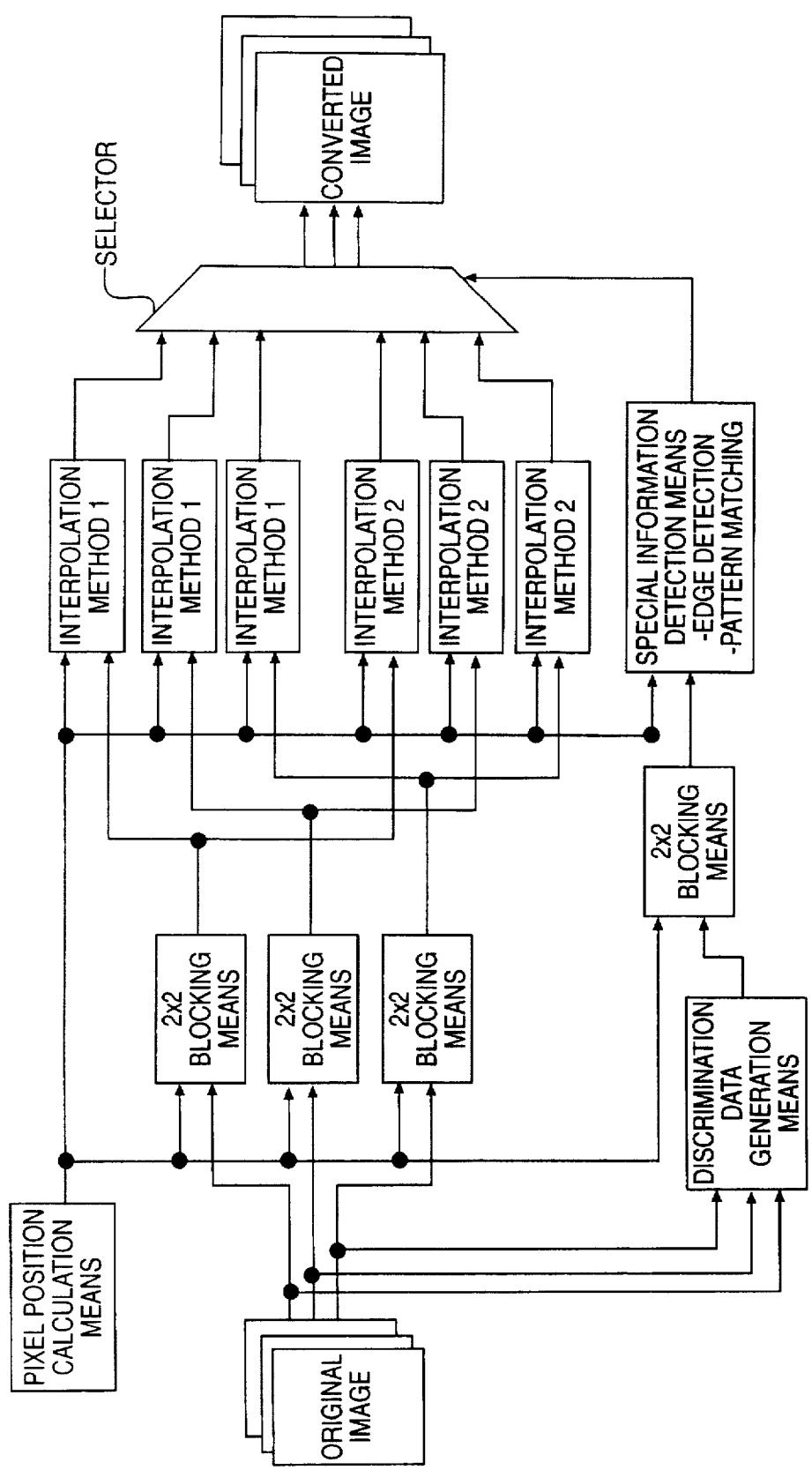
FIG. 22 is a block diagram showing a conceptual view of the image resolution conversion method according to the present invention as applied to a color image resolution conversion.

As when applied to the gray-scale image, switching of the conversion process depending on edge detection and pattern-matching is performed on each of the yellow, magenta and cyan components of the color image and the results are shown in FIGS. 21(a)–(c). In these figures, post-conversion pixels in the hatched area are calculated by nearest neighbor interpolation and pixels in the white area are calculated by bi-linear interpolation. It can be seen that there are some pixels which are converted by nearest neighbor interpolation in the magenta image but converted by bi-linear interpolation in the cyan image, which causes gaps in the gradational image, thus making it impossible to obtain a high quality image of converted resolution. If such pixels occur in a colored character image or colored line image, they cause defects such as color blurring or undesirable color generation along an edge. FIG. 22 shows the concept of the second embodiment of the image resolution conversion apparatus according to the present invention. The interpolation method selected to be applied to a single pixel is identical in all of the different color components such as R, G, B, or Y, M, C, and consequently the image quality after resolution conversion is improved. Detailed description of the second embodiment based on FIG. 23 is as follows.

Figure 23:
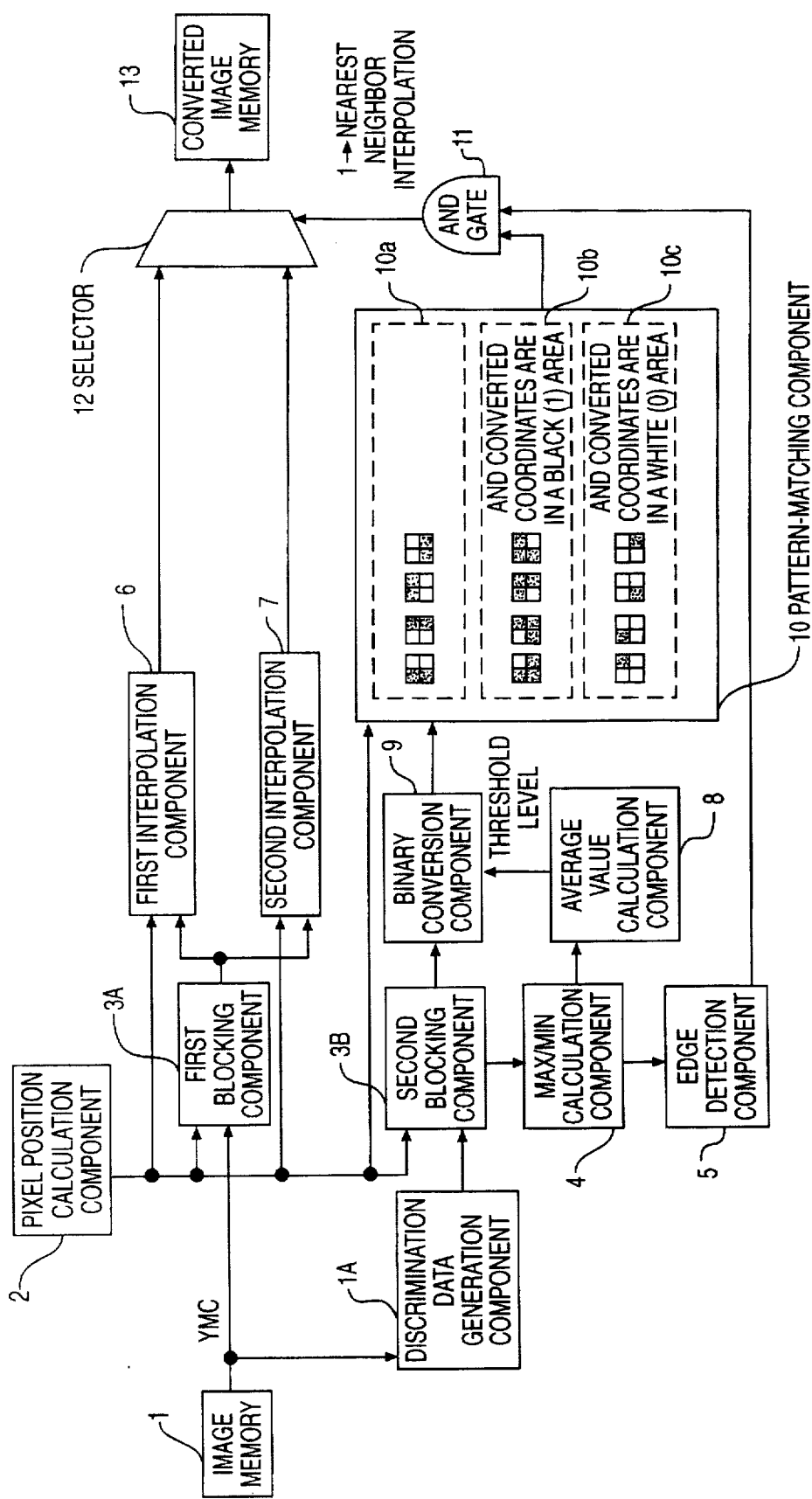
FIG. 23 is a block diagram of a hardware construction in the case where an image resolution conversion method according to the present invention is applied to a color image.

FIG. 23 shows an image processing apparatus performing resolution conversion for a multivalued digital color image consisting of yellow, magenta and cyan signals. In the figure, a multivalued digital color image is input to an image memory 1. A position calculation component 2 calculates positions of post-conversion pixels. A discrimination data generation component 1A generates discrimination data, which will be described later, used for edge detection and pattern-matching. In this embodiment, the discrimination data generation component 1A generates a lightness signal including information related to lightness which affects the occurrence of contouring effects or gradational gaps after resolution conversion is carried out. The lightness signal can be determined by the following linear expression:

$$\alpha \times Y + \beta \times M + \xi \times C + \theta$$

Based on the position of the post-conversion pixel input by the position calculation component 2, a first blocking component 3A reads data for a block of 2 pixels vertically and 2 pixels horizontally, a total of four pixels in the original image from the image memory 1, which are necessary for edge detection and pattern-matching. A second blocking component 3B reads the discrimination data required to interpolate the post-conversion pixel from the discrimination data generation component 1A. Each of the blocking components 3A and 3B selects pre-conversion pixels necessary to calculate the post-conversion pixel value by bi-linear interpolation.

A max/min calculation component 4 calculates the maximum and minimum values of the four pixels blocked by the second blocking component 3B. An edge detection component 5 finds the difference between the maximum and minimum values obtained by the max/min calculation component 4, and performs binary conversion by comparing the difference with a predetermined threshold level. If the difference between maximum and minimum values is larger than the threshold level, the edge detection component 5 outputs 1 and if the difference is not more than the threshold level, outputs 0. That is, 1 is output corresponding to edges where the image data changes sharply.

A first interpolation component 6 calculates a value of the post-conversion pixel for each of the Y, M and C components by bi-linear interpolation. A second interpolation component 7 calculates the value of the post-conversion pixel for each of the Y, M and C components by nearest neighbor interpolation. A binary conversion component 9 performs binary conversion for the discrimination data of pixels having been blocked by the second blocking component 3B based on the threshold level provided by an average value calculation component 8.

The average value calculation component 8 calculates the average value of the maximum and minimum values in a block obtained by the max/min calculation component 4, and the average value is output to the binary conversion component 9 as a second threshold level. A pattern-matching component 10 compares a block pattern binarily converted by the binary conversion component 9 with the position of a post-conversion pixel calculated by the pixel position calculation component 2. If the binarily converted block pattern and the position of post-conversion pixel correspond to one of the conditions in comparison components 10a, 10b and 10c, the pattern-matching component 10 outputs 1, and if there is no correspondence, outputs 0. The process of this pattern-matching is the same as the previous description based on FIGS. 3–6.

An AND gate 11 provides the logical AND of the output of the pattern-matching component 10 and the output of the edge detection component 5 which is the binary conversion result of edge detection value of the difference between the maximum and minimum values in a block. That is, the AND gate 11 outputs 1 if both of the outputs of the pattern-matching component 10 and the edge detection component 5 are 1. A selector 12 switches between bi-linear interpolation and nearest neighbor interpolation depending on the output of the AND gate 11. If the output of the AND gate 11 is 0, the selector 12 selects the result of bi-linear interpolation by the first interpolation component 6 and outputs it to a converted image memory 13, and on the other hand, if the output of the AND gate 11 is 1, the selector 12 selects the result of nearest neighbor interpolation by the second interpolation component 7 and outputs it to the converted image memory 13.

In the description above, the discrimination data was generated by a linear operation on the YMC components, but this depends on the color space of the input image. In the present invention, the discrimination data may be anything which represents the spatial characteristics of the color image, and therefore, for example, a signal representing lightness which affects the occurrence of contouring effects or the like can be used. In the case where the input image is represented in a color space of luminance and chromaticity values represented by data values such as L*a*b* or YCrCb, the L* signal or Y signal can be selected and output as the data. In the case of a BGR or YMC image, the green signal or magenta signal can be utilized as the discrimination data, thus simplifying the construction of the apparatus.

In the present invention, generation of the discrimination data includes, other than generation of a data value based on plural types of data representing a color image, selection of a single data value from those plural types.

The embodiment described above employs the bi-linear interpolation method as an example of a resolution conversion method, but the present invention is not limited to the bi-linear interpolation method provided that the means is to perform interpolation based on a group of original pixels surrounding a post-conversion pixel.

The first interpolation component of the embodiment described above has a magnification function, but the present invention can be applied not only to magnification conversion, but also applied to contraction conversion, and furthermore it is possible to perform conversion by an arbitrary factor.

Though the embodiment described above discriminates image data of an edge when the difference between maximum and minimum values is larger than a threshold level, many edge detection means other than this are known and any of them may be used.

The embodiment described above takes the example of a block of 2×2 pixels, but a block of 3×3 pixels, 5×5 pixels or whatever one equally be selected.

As described above, the occurrence of contouring effects in a gradational portion or blurring around edges is prevented, and thereby a high quality image of a different resolution can be obtained according to the present invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image resolution conversion method for converting an image of a first resolution represented by multivalued digital data into an image of a second resolution represented by multivalued digital data, comprising the steps of:

assigning a block, defined by a plurality of pre-conversion pixels of said first resolution image, to a post-conversion pixel;

performing edge detection in said block based on data for each of said plurality of pre-conversion pixels that define said block and outputting a detected edge signal;

generating an edge pattern by binary conversion of the pixels of said block, said binary conversion converting pixels to a value of 0 or 1;

a first comparison step of comparing said generated edge pattern with a predetermined pattern and outputting a comparison component, said first comparison step including the step of determining whether the binary conversion value of the pre-conversion pixel, in which the post-conversion pixel is located, is 0 or 1;

a second comparison step of comparing said detected edge signal to said comparison component; and performing resolution conversion by a first interpolation method when a result of said second comparison step satisfies predetermined conditions, and performing resolution conversion by a second interpolation method when the result of said second comparison does not satisfy said predetermined conditions, wherein said first and second interpolation methods use different interpolation methodologies.

2. A method according to claim 1 wherein the block assigning step includes the step of assigning a parallelogram-shaped block to a post-conversion pixel, such that said block has a plurality of equally sized sections.

3. An image resolution conversion method for converting an image of a first resolution represented by multivalued digital data into an image of a second resolution represented by multivalued digital data, comprising the steps of:

assigning a block, defined by a plurality of pre-conversion pixels of said first resolution image, to a post-conversion pixel;

performing edge detection in said block based on data for each of said plurality of pre-conversion pixels that define said block;

generating an edge pattern by binary conversion of the pixels of said block, said binary conversion converting pixels to a value of 0 or 1;

comparing said edge pattern and a position of said post-conversion pixel in the block with a predetermined pattern and a predetermined position of said post-conversion pixel, said comparing step includes determining whether the binary conversion value of the pre-conversion pixel, in which the post-conversion pixel is located, is 0 or 1; and performing resolution conversion by a first interpolation method when a result of said comparison satisfies predetermined conditions, and performing resolution conversion by a second interpolation method when the result of said comparison does not satisfy said predetermined conditions, wherein said first and second interpolation methods use different interpolation methodologies.

4. A method according to claim 3 wherein the block assigning step includes the step of assigning a parallelogram-shaped block to a post-conversion pixel, such that said block has a plurality of equally sized sections.

5. An image resolution conversion apparatus for converting an image of a first resolution represented by multivalued digital data into an image of a second resolution represented by multivalued digital data, comprising:

first interpolation means for performing interpolation to obtain a data value for a post-conversion pixel based on data for pre-conversion pixels surrounding said post-conversion pixel;

second interpolation means for performing interpolation to obtain a data value for a post-conversion pixel by a different methodology from the interpolation of said first interpolation means;

blocking means for forming a block defined by a plurality of pixels of said first resolution image surrounding said post-conversion pixel based on coordinates of said post-conversion pixel;

edge detection means for performing edge detection in said block formed by said blocking means based on data for each of said plurality of pixels that define said block;

pattern generation means for generating an edge pattern by binary conversion of the pixels of said block formed by said blocking means, said binary conversion converting pixels to a value of 0 or 1;

first comparison means for comparing said edge pattern generated by said pattern generation means with a predetermined pattern and outputting a comparison component, such that a binary conversion value of the pre-conversion pixel, in which the post conversion pixel is located, is 0 or 1;

second comparison means for comparing said comparison component with said detected edge; and switching means, employing said second interpolation means, for obtaining data for said post-conversion pixel when said second comparison means finds a correspondence between said comparison component and said detected edge, and employing said first interpolation means when said second comparison means finds no correspondence between said comparison component and said detected edge.

6. An apparatus according to claim 5 wherein the blocking means includes means for forming a parallelogram-shaped block having a plurality of equally sized sections.

7. An image resolution conversion apparatus for converting an image of a first resolution represented by multivalued digital data into an image of a second resolution represented by multivalued digital data, comprising:

first interpolation means for performing interpolation to obtain a data value for a post-conversion pixel based on data for pre-conversion pixels surrounding said post-conversion pixel;

second interpolation means for performing interpolation to obtain a data value for a post-conversion pixel by a different methodology from the interpolation of said first interpolation means;

blocking means for forming a block defined by a plurality of pixels of said first resolution image surrounding said post-conversion pixel based on coordinates of said post-conversion pixel;

edge detection means for performing edge detection in said block formed by said blocking means based on data for each of said plurality of pixels that define said block;

pattern generation means for generating an edge pattern by binary conversion of the pixels of said block formed by said blocking means, said binary conversion converting pixels to a value of 0 or 1;

first comparison means for comparing said edge pattern generated by said pattern generation means with a predetermined pattern, such that a binary conversion value of the pre-conversion pixel, in which the post-conversion pixel is located, is 0 or 1;

second comparison means for comparing said edge pattern generated by said pattern generation means and a position of said post-conversion pixel in the block with a predetermined pattern and a predetermined position of said post-conversion pixel; and switching means, employing said second interpolation means, for obtaining data for said post-conversion pixel when said first comparison means finds a correspondence between said generated edge pattern and said predetermined pattern or when said second comparison means finds a correspondence between said generated edge pattern and the position of said post-conversion pixel and said predetermined pattern and said predetermined position of said post-conversion pixel.

8. An apparatus according to claim 7 wherein the blocking means includes means for forming a parallelogram-shaped block having a plurality of equally sized sections.

9. An image resolution conversion apparatus for converting each pixel of color image data of a first resolution represented by plural components of multivalued digital data into color image data of a second resolution represented by multivalued digital data, comprising:

discrimination data generation means for generating discrimination data for each pixel representative of spatial characteristics of said color image data of said first resolution;

first interpolation means for performing interpolation to obtain a data value for a post-conversion pixel based on data for pixels surrounding said post-conversion pixel for each component of said multivalued digital data;

second interpolation means for performing interpolation to obtain a data value for said post-conversion pixel for each component of said multivalued digital data, by a different methodology from the interpolation of said first interpolation means;

blocking means for forming a block defined by a plurality of pixels surrounding said post-conversion pixel;

edge detection means for performing edge detection in said block formed by said blocking means based on discrimination data for each pixel of said block;

pattern generation means for generating an edge pattern by binary conversion of the discrimination data values for said pixels of said block formed by said blocking means, said binary conversion converting pixels to a value of 0 or 1;

first comparison means for comparing said generated edge pattern with a predetermined pattern and outputting a comparison component, such that a binary conversion value of the pre-conversion pixel, in which the post conversion pixel is located, is a 0 or 1;

second comparison means for comparing said comparison component with said detected edge; and switching means, employing said second interpolation means, for obtaining data for said post-conversion pixel when said second comparison means finds a correspondence between said comparison component and said detected edge, and for employing said first interpolation means when said second comparison means finds no correspondence between said comparison component and said detected edge.

10. An apparatus according to claim 9 wherein the blocking means includes means for forming a parallelogram-shaped block having a plurality of equally sized sections.

11. An image resolution conversion method for converting an image of a first resolution represented by multivalued digital data into an image of a second resolution represented by multivalued digital data, comprising the steps of:

assigning a block, defined by a plurality of pre-conversion pixels of said first resolution image, to a post-conversion pixel;

detecting edges of said first resolution image in said block;

converting pixels of said first resolution image into binary data with a value of 0 or 1:

comparing predetermined patterns with said binary data in said block converted by said converting step;

performing a first resolution conversion on said block by a first interpolation method and a second interpolation method when the step of detecting edges determines that at least one edge exists and the binary data agree with one of the predetermined patterns, wherein said first interpolation and second interpolation methods use different methodologies, and wherein said first resolution conversion performing step includes the steps of switching the first and second interpolation methods based on whether the binary data of the converted pixels are 0 or 1; and performing a second resolution conversion of said block by one of said first and second interpolation methods when the step of detecting edges determines that no edge exists or that the at least one edge does not take on the predetermined pattern.

12. A method according to claim 11, wherein an interpolation method post-conversion pixel value is calculated based on the plurality of pre-conversion pixels, and a second interpolation method post-conversion pixel value is calculated based on one of the pre-conversion pixels.

13. A method according to claim 11, wherein said predetermined patterns are used for detecting a slanting edge.

14. A method according to claim 11 wherein the step of assigning includes the step of assigning a parallelogram-shaped block to a post-conversion pixel, such that said block has a plurality of equally sized sections.

* * * * *

UNITED STATES PATENT AND TRADEMARK OFFICE
CERTIFICATE OF CORRECTION

PATENT NO. : 5,754,710
DATED : May 19, 1998
INVENTOR(S) : Hiroshi Sekine et al.

It is certified that error appears in the above-identified patent and that said Letters Patent is hereby corrected as shown below:

On the title page: Item [54] and Col. 1, line 3
please change "APPRATUS" to --APPARATUS--.

Signed and Sealed this

Fifteenth Day of September, 1998

Attest:

BRUCE LEHMAN

Attesting Officer    Commissioner of Patents and Trademarks